Oct. 2, 1923.  
F. V. ELBERTZ  
1,469,433  
TRACTION WHEEL DRIVE GEARING  
Filed Jan. 17, 1920    2 Sheets-Sheet 1
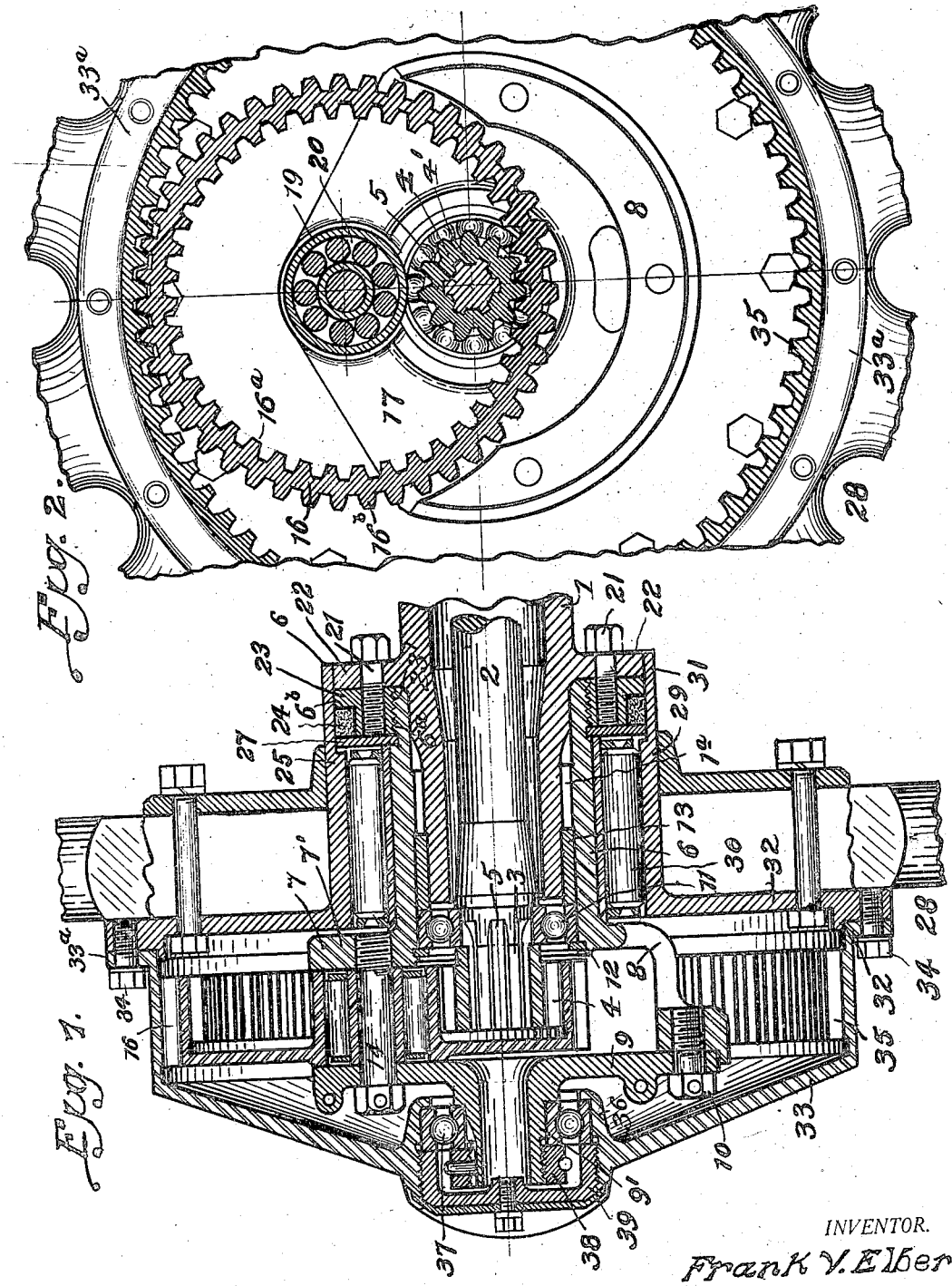
INVENTOR.  
Frank V. Elbertz  
BY  
ATTORNEY.

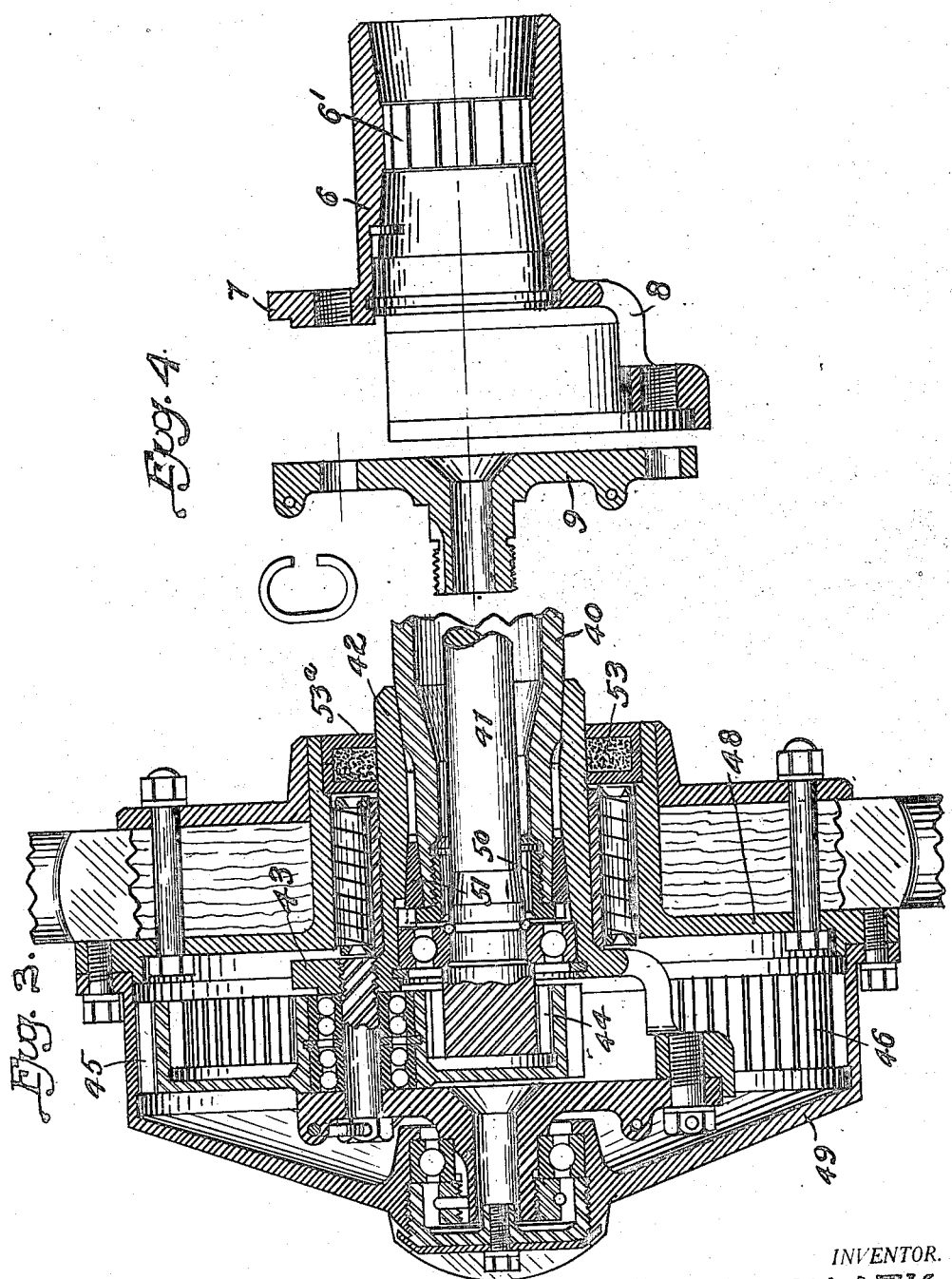

Patented Oct. 2, 1923.

1,469,433

UNITED STATES PATENT OFFICE.

FRANK V. ELBERTZ, OF KOKOMO, INDIANA.

TRACTION-WHEEL DRIVE GEARING.

Application filed January 17, 1920. Serial No. 352,151.

*To all whom it may concern:*

Be it known that I, FRANK V. ELBERTZ, a citizen of the United States, residing at Kokomo, in the county of Howard and State of Indiana, have invented certain new and useful Improvements in Traction-Wheel Drive Gearing, of which the following is a specification, reference being had therein to the accompanying drawing.

This invention relates to improvements in traction wheel drive gearing, and has for its object to simplify and cheapen such mechanism, to provide an improved efficient gearing for this purpose of a simple durable nature in which the proper operative relation of the parts will be maintained, and the construction is such as to permit of the ready removal and dismounting of the same.

Important novel characteristics of the invention reside in the special combination of gear elements employed, whereby the number of parts is materially reduced, and whereby the extent of active intermeshing between the gear elements is enlarged so that the strain upon the gears is better distributed throughout the same and the use of less expensive gear elements permitted.

The invention, with other objects and advantages thereof, and the particular construction, combination and arrangement of parts comprising the same, will be understood from the following detailed description when considered in connection with the accompanying drawings forming part hereof and illustrating embodiments of the invention.

In the drawings:—

Figure 1 is a central transverse section of a traction wheel and drive gearing constructed in accordance with the present invention.

Figure 2 is a side elevation, looking from the outer side of the wheel, with parts shown in section.

Figure 3 is a central transverse section of a slightly modified construction.

Figure 4 is a detailed view of the gear supporting frame and its sleeve.

Referring in detail particularly to the construction illustrated in Figs. 1, 2 and 4 of the drawings, 1 designates the usual fixed tubular axle of a motor vehicle, and 2 the driving axle, to which power is imparted from the customary differential gearing (not shown).

In accordance with the present invention, the driving axle has an end portion 3 extending beyond the end of the tubular axle 2, and fixed thereon to rotate therewith is a drive pinion 4, said pinion being shown as tubular with a plurality of longitudinal grooves 4', and the end of the driving axle 3 with splines 5 engaging the grooves 4' of the pinion.

Fixed upon the tubular axle 1 is a sleeve 6 carrying at its outer end beyond the end of the tubular axle a gear supporting frame comprising an end plate 7, a partially cylindrical part 8 integral therewith and an outer end plate 9, the latter being formed as a separate part and detachably secured to the partially cylindrical part 8 by bolts 10, said outer end plate 9 having a tubular cylindrical bearing portion 9' at its outer side. 11 designates an anti-friction ball bearing between the outer end portion of the driving axle 2 and the sleeve 6, and 12 and 13 are retaining rings for said anti-friction bearing. On the gear supporting frame between the end parts 7 and end plate 9 extends a shaft bearing, said bearing being shown in the form of a bolt 14 passing through an aperture in the removable end plate 9 and engaging a threaded aperture 7' in the inner part 7 of the frame. Mounted for rotation on the bearing 14 is an annular gear member 16 having an internal gear $16^a$ and an external gear $16^b$, and provided with an integral web or plate 17 extending inwardly from one end thereof and carrying a central bearing sleeve 19, which fits upon a circular roller bearing 20 positioned on the bearing 14, the internal gear $16^a$ of the annular gear member meshing with the pinion 4. Any suitable means may be employed to lock the sleeve 6 to the tubular axle 1 against rotary movement relatively thereto. In the present instance, the sleeve 6 is provided with spaced longitudinal ribs or teeth 6', which engage longitudinally extending grooves $1^a$ in the outer face of the tubular axle 1. The sleeve 6 is secured against longitudinal movement on the tubular axle by bolts 21 engaging a flange 22 on the tubular axle and a collar 23 on the inner end of the sleeve 6, said collar fitting against the flange 22 of the tubular axle. The collar is formed as a separate part from the sleeve 6 and adjustably connected thereto, the collar having an interiorly threaded part 23' engaging a threaded portion 6ª on the sleeve. The collar is provided with an annular recess 6ᵇ, in which is seated a washer 24 of felt or other suitable material, and held between the inner end of the collar 23 and an annular shoulder 25 on the sleeve 6 is a metal washer plate 27.

28 designates the traction wheel mounted for rotation upon the sleeve 6. The wheel 28 has a bearing sleeve 29 to fit upon a circular roller bearing 30 arranged on the sleeve 6. At one end of the hub sleeve 29 is an extension 31 adapted to fit over the outer face of the washer 24, collar 23, and flange 22. At its opposite end the hub sleeve 29 has formed integral therewith a cover plate 32 provided with an annular flange 32ʲ. 33 designates an outer removable cover plate detachably secured at its marginal portion 33ª to the marginal portion of the cover plate 32 by bolts 34. On the outer cover plate is an internal gear 35 meshing with the external gear 16ª of the annular gear member 16, motion being imparted to the traction wheel from the driving axle 2 through the drive pinion 4, the internal and external gears of the annular gear member 16 and the internal gear 35 on the outer cover plate 33. The outer cover plate 33 has a tubular bearing part 36 at its central portion engaging the bearing 9' on the gear supporting frame. 37 designates an anti-friction ball bearing interposed between the part 36 and bearing 9', and 38 is a retaining nut engaging a threaded portion on the outer end of the bearing 9'. A cap 39 removably fitting within the bearing 36 of the outer cover plate closes the same at its outer end, the inner and outer cover plates 32 and 33 forming a casing completely enclosing the parts and adapted to contain lubricating oil.

It will be noted that the particular construction and arrangement of parts hereinbefore described affords a very simple, efficient and durable construction. Only three main gear members are required, the number of parts being materially reduced, and the special combination of gear elements employed, including the intermediate annular ring member internally and externally geared, provides for an increased extent of intermeshing or engagement of teeth between the intermediate gear and the internal gear on the wheel, the strains on the gear elements being thus distributed over an increased area thereof and permitting the use of less expensive gear elements, and materially reducing the number of parts and the cost of production.

Referring to the modified construction illustrated in Fig. 3 of the drawings, 40 designates the tubular axle, 41 the driving axle, 42 the gear frame supporting sleeve, 43 the gear frame carried by the sleeve, 44 the pinion on the end of the driving axle 41, and 45 the annular gear member meshing with the gear pinion 42 and the internal gear 46 on the traction wheel 47. 48 and 49 are the inner and outer cover plates. This modified construction is substantially the same as that illustrated in Figures 1, 2 and 4, with the exception of the means employed for securing the gear supporting frame sleeve on the tubular axle against longitudinal movement, and the form of joint or dust-proof connection provided between the inner end of the hub sleeve and the tubular axle. In this instance, the sleeve 42 is held in place upon the tubular axle 40 by means of a tubular nut 50 engaging the inner end of a wedge-shaped bearing sleeve 51 located at the outer end of the sleeve 42. 53 designates a packing of felt or like material seated in a recess in the outer face of a ring 53, the latter being carried at the inner end of the hub sleeve and fitting against the outer face of the sleeve 42.

While I have illustrated in the drawings, by way of example, two specific forms which the invention may take, it will of course be understood that minor changes and variations in the particular constructions illustrated, and the embodiment of the invention in other forms, as will appeal to those skilled in the art, and falling within the scope of the appended claims, may be practiced without departing from the spirit of the invention.

What I claim is:—

1. In a traction wheel drive gearing, the combination of a tubular axle, a driving axle, a pinion fixed on the driving axle, a bearing on the tubular axle, an annular gear member having an internal gear and external gear, said annular gear member being provided with a part extending inwardly from one end thereof and a centrally disposed tubular bearing carried by said inwardly extending part, the tubular bearing being mounted upon the bearing on the tubular axle, a traction wheel supported for rotation upon the tubular axle, and a gear connection between the external gear of the annular gear member and the traction wheel.

2. In a traction wheel drive gearing, the combination of a tubular axle, a driving axle, a pinion on the driving axle, a sleeve fixed on the tubular axle, a gear supporting frame carried by the sleeve at one end thereof, said gear supporting frame having a tubular extension at its outer end, an annular gear member having an internal gear and an external gear mounted for rotation in the gear supporting frame, a traction wheel mounted for rotation upon the sleeve, a side cover plate fixedly secured to the traction wheel and having an internal gear at its inner side in mesh with the external gear of the annular gear member, and a bearing between the central part of said cover plate and said tubular extension of the gear supporting frame.

In testimony whereof I hereunto affix my signature in the presence of two witnesses.

FRANK V. ELBERTZ.

Witnesses:
 REBA K. PLUMMER,
 WM. I. SEARLES.